Patented Sept. 11, 1934

1,973,478

UNITED STATES PATENT OFFICE 1,973,478

PROCESS FOR MAKING ETHERS OF CELLULOSE AND NEW PRODUCTS OF THIS CLASS

Charles Gränacher, Basel, and Karl Meier, Zurich, Switzerland

No Drawing. Application December 26, 1929, Serial No. 416,748. In Switzerland December 28, 1928

6 Claims. (Cl. 260—152)

The present invention relates to the manufacture of ethers of cellulose, of which a great number are new. It comprises the process of making these products and the new products.

It has been found that diazotizable cellulose ethers are obtained by causing a compound of the general formula

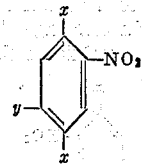

wherein the one $x$ stands for a halogen atom, the other $x$ for the nitro group, and $y$ for a hydrogen atom or a halogen atom, to react, in presence of non-caustic acid binding agents, on cellulose, and treating the products thus obtained with reducing agents.

The cellulose may be employed as such or in an activated state. It can also be employed in a partly altered form, for instance as a partially acylated cellulose. The term activated state is understood to comprise the so-called regenerated cellulose, such for example as the viscose silk or the cuprammonium silk, or also swollen cellulose. If the cellulose has been swollen with aid of agents having an alkaline action, it is recommended to remove the swelling agent by washing. By acid binding agents having a non-caustic action there are above all understood the carbonates of the alkali or alkaline earth metals. Naturally also further inorganic compounds having a similar action may be used. The compounds with which the cellulose is condensed or etherified comprise all compounds which, on the one hand, contain a nitro-group bound to a benzene nucleus and, on the other hand, contain an easily exchangeable substituent, such as, for example, a halogen atom which is loosened in that it stands in a side chain, or that in the benzene nucleus it has acquired reactivity by the simultaneous presence of an acid group, such as, for example, a nitro-group.

The etherification is advantageously being carried out in presence of water. The operation may also be conducted in presence of inert diluents.

The reduction of the nitro-group of the condensation products may be effected by the most varied reducing agents. It is, however, advantageous to operate with such reducing agents which neither require an acid nor a strongly alkaline medium, since thereby the ethers may in part become saponified. It is further advantageous to use such reducing agents which may easily get into intimate contact with the cellulose fiber. It is therefore recommendable to use as reducing agents such salts having a reducing action which may exert their reducing action in a weakly alkaline medium. Such products are for example sulfhydrate, or salts of the hydro-sulfurous acid.

The new cellulosic ether forms colorless to lightly colored fibers which are insoluble in water, alcohol, acetone, and the like. It is characterized by —O—phenyl nuclei being bound to the cellulose residue, the phenyl-nucleus containing at least one amino group. By this fact the new cellulosic ether has become diazotizable and can be dyed intensively and fast by diazotization and development with suitable coupling components.

The following examples illustrate the invention:—

Example 1

(a) Moist cuprammonia silk in the form of skeins is handled for 4 hours in fused nitro-benzyl-chloride, to which an acid binding agent, such as chalk powder, sodium carbonate, or lithium carbonate, has been added. It is immaterial for carrying out the process whether pure ortho-, meta-, or para-nitro-benzylchloride is used, or whether a mixture of these, such as is obtained by nitrating benzyl-chloride, is employed. The nitrobenzylated cuprammonia silk thus obtained is washed with water and reduced by heating it for several hours at water-bath temperature with a solution of sodium hydro-sulfide of 10 per cent. strength. In this manner there is obtained an almost white fiber, the lustre of which has not essentially suffered, and which by diazotization and combination with coupling components can be dyed fast tints.

(b) Cotton in the form of mercerized yarn is rendered alkaline by immersing it for several hours in caustic soda solution. The alkali is then carefully washed out, the fibre heated for 6 hours at 110–120° C. in an autoclave provided with a stirrer in a solution of nitro-benzylchloride in acetone, or better still in xylene, to which sodium carbonate has been added. The cotton thus treated is washed and then treated with reducing agents as described in the preceding paragraph. The bright fiber thus obtained is diazotizable and couples with coupling components.

Example 2

Cotton in the form of mercerized yarn is swollen by immersion for several hours in caustic soda solution of 10 per cent. strength. The alkali is then carefully washed out, and the fibers in moist conditions are now treated, at 90-95° C., for several hours, in presence of lithium carbonate, with fused 1-chloro-2:4-dinitrobenzene. After this operation, the cotton is washed and treated as described in Example 1 with a reducing agent. There is thus also obtained a bright fiber which is tetrazotizable on the fiber. If only one nitro group is intended to be reduced, the reduction is carried out in the cold in a solution of sodium hydrosulfite of 1 to 2 per cent. strength.

Similar products are obtained from ortho-dinitrobenzenes, such for example as 1:2-dinitro-4-chloro-benzene, 1:2-dinitro-4:5-dichloro-benzene, 1:2-dinitro-4-bromo-benzene. In these cases the exchangeable substitutent is the nitro group.

What we claim is:

1. Process for the production of new cellulose ethers, consisting in causing 1:2-dinitro-4:5-dichloro-benzene, to react, in presence of non-caustic acid binding agents, on cellulose having been converted into an activated form, and treating the products thus obtained with salts having a reducing action in a weakly alkaline medium.

2. Process for the production of cellulose ethers, consisting in causing a compound of the general formula

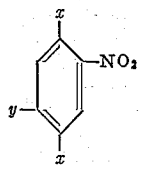

wherein the one $x$ stands for a halogen atom, the other $x$ for the $NO_2$-group, and $y$ for a hydrogen atom or a halogen atom, to react, in the presence of non-caustic acid binding agents, on cellulose, and treating the products thus obtained with reducing agents.

3. Process for the production of cellulose ethers, consisting in causing a compound of the general formula

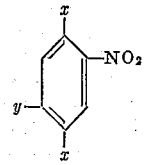

wherein the one $x$ stands for a halogen atom, the other $x$ for the $NO_2$-group, and $y$ for a hydrogen atom or a halogen atom, to react, in the presence of non-caustic acid binding agents, on cellulose, and treating the products thus obtained with salts having a reducing action.

4. Process for the production of cellulose ethers, consisting of causing a compound of the general formula

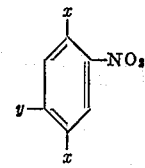

wherein the one $x$ stands for a halogen atom, the other $x$ for a $NO_2$-group, and $y$ for a hydrogen atom or a halogen atom, to react, in the presence of non-caustic acid binding agents, on cellulose, and treating the products thus obtained with salts having a reducing action in a weakly alkaline medium.

5. As products of cellulose ethers which contain bound to the cellulose radicle radicles of the general formula

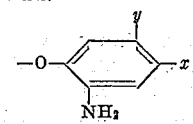

wherein $x$ stands for a halogen atom, the amino group or the nitro group and $y$ for a hydrogen atom or a halogen atom, which products are obtained in causing to react, in the presence of non-caustic acid binding agents, on cellulose a compound of the general formula

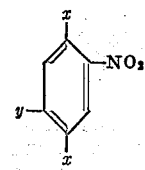

wherein the one $x$ stands for a halogen atom, the other $x$ for the $NO_2$-group, and $y$ for a hydrogen atom or a halogen atom, and treating the products thus obtained with reducing agents, which products are diazotizable and can then be combined with any coupling component.

6. As products the cellulose ethers which contain bound to the cellulose radicle radicles of the formula

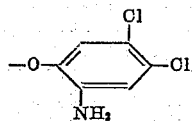

which products are obtained in causing to react 1:2-dinitro-4:5-dichlorobenzene, in the presence of non-caustic acid binding agents, on cellulose and treating the products thus obtained with reducing agents, which products are diazotizable and can then be combined with any coupling component.

CHARLES GRÄNACHER.
KARL MEIER.